(12) United States Patent
Lütze et al.

(10) Patent No.: US 7,372,173 B2
(45) Date of Patent: May 13, 2008

(54) WIND FARM AND METHOD FOR OPERATING SAME

(75) Inventors: Hans Lütze, Bad Bentheim (DE); Stefan Rieken, Fresenburg (DE); Dietmar Meyer, Bremen (DE)

(73) Assignee: General Electric Company, Schenectady, NY (US)

( * ) Notice: Subject to any disclaimer, the term of this patent is extended or adjusted under 35 U.S.C. 154(b) by 134 days.

(21) Appl. No.: 10/549,379

(22) PCT Filed: Apr. 8, 2004

(86) PCT No.: PCT/EP2004/003804

§ 371 (c)(1), (2), (4) Date: Jun. 15, 2006

(87) PCT Pub. No.: WO2005/067119

PCT Pub. Date: Jul. 21, 2005

(65) Prior Publication Data

US 2007/0047163 A1 Mar. 1, 2007

(30) Foreign Application Priority Data

Apr. 9, 2003 (EP) .................................. 03008295

(51) Int. Cl.
*F03D 7/00* (2006.01)

(52) U.S. Cl. .......................................... 290/44; 290/55

(58) Field of Classification Search ................ 290/43, 290/44, 54, 55; 307/86, 65
See application file for complete search history.

(56) References Cited

U.S. PATENT DOCUMENTS

| | | | | |
|---|---|---|---|---|
| 3,156,828 A | * | 11/1964 | Hopper, Jr. et al. ......... | 307/57 |
| 4,193,005 A | * | 3/1980 | Kos et al. ...................... | 290/44 |
| 4,461,957 A | * | 7/1984 | Jallen ........................... | 290/44 |
| 6,137,187 A | * | 10/2000 | Mikhail et al. ................ | 290/44 |
| 6,420,795 B1 | * | 7/2002 | Mikhail et al. ................ | 290/44 |
| 6,600,240 B2 | * | 7/2003 | Mikhail et al. ................ | 307/85 |
| 7,081,689 B2 | * | 7/2006 | Tilscher et al. ................ | 290/44 |
| 7,262,520 B2 | * | 8/2007 | Nguyen et al. ................ | 307/86 |

* cited by examiner

*Primary Examiner*—Nicholas Ponomarenko
(74) *Attorney, Agent, or Firm*—Blakely, Sokoloff, Taylor & Zafman LLP

(57) ABSTRACT

A wind farm with at least two wind turbines (1, 2, 3, 4) connected to a power grid is provided, said wind farm further comprising a control unit (5) connected to said at least two wind turbines (1, 2, 3, 4), and a sensor unit (6) connected to said power grid and said control unit (5), wherein said sensor unit (6) is adapted to measure the grid frequency of said power grid and to transmit said measured grid frequency to said control unit (5), and wherein said control unit (5) is adapted to control the output of real power of said wind farm according to said measured grid frequency. Furthermore, a method for operating a wind farm is proposed, said method comprising the steps of measuring the grid frequency with a sensor unit, transmitting said measured grid frequency to a centralized control unit, determining whether the measured grid frequency lies outside a predetermined range, and, if the measured grid frequency lies outside said predetermined range, selecting at least one out of the at least two wind turbines comprised in said wind farm by said centralized control unit and regulating the power output of said selected at least one wind turbine.

18 Claims, 6 Drawing Sheets

WIND FARM AND METHOD FOR OPERATING SAME

CROSS-REFERENCE TO RELATED APPLICATIONS

This application is a National Phase Application of International Application No. PCT/EP2004/003804, filed Apr. 8, 2004, which claims the priority of EP Patent Application No. 03008295.2, filed Apr. 9, 2003. The present application claims priority from both applications.

FIELD OF THE INVENTION

The invention relates to a wind farm and a method for operating said wind farm, especially to a method for controlling the real power output of said wind farm depending on a measured variable of the power grid to which the wind farm is connected.

BACKGROUND OF THE INVENTION

Nearly every power generating plant—be it a nuclear power plant, a cogeneration plant, a wind power station—generates the current by a generator which converts mechanical energy into electrical power.

Usually, the generator is connected to a power line conducting electrical current. The power line from which consumer loads connected to it obtain their power, should have a defined grid parameters, in particular, a defined voltage and a defined frequency. For example, the desired values for the average German household on the low voltage level are 230 Volts and 50 Hertz (Hz).

The stability of the grid parameters is dependent on a variety of influencing variables including the balance between generated power and the consumed power at every instant. Any imbalance between generated (real) power and consumed (real) power leads to changes in the grid frequency. When more power is generated than consumed, the frequency rises, if more power is consumed than generated, it decreases. In order to avoid overload within the combined grid systems and to control the load flow, it is vital to maintain the grid frequency fluctuation as small as possible.

As the installed power of wind turbines increases, wind power generation has an increasing influence on the grid stability. Therefore, it becomes more and more important for wind farms to contribute to the grid stabilization by controlling the real power output of a wind farm dependent on the grid frequency.

SUMMARY OF THE INVENTION

It is therefore an object to provide an improved wind farm and a method for operating the same, in particular a wind farm which can be effectively controlled with regard to the stabilization of the grid parameters, in particular with regard to the grid frequency.

This object is solved by a wind farm according to independent claims 1 or 7 and by operating methods according to independent claims 13 and 14 as well as the procedures according to independent claims 20 and 21. Further advantages, features, aspects and details of the invention are evident from the dependent claims, the description and the accompanying drawings. The claims are intended to be understood as a first non-limiting approach of defining the invention in general terms.

According to an embodiment of the present invention, a wind farm with at least two wind turbines connected to a power grid is provided, said wind farm further comprising a control unit connected to said at least two wind turbines, and a sensor unit connected to said power grid and said control unit, wherein said sensor unit is adapted to measure the grid frequency of said power grid and to transmit said measured grid frequency to said control unit, and wherein said control unit is adapted to control the output of real power of said wind farm according to said measured grid frequency.

The above described embodiment of the present invention allows for a stabilization of the grid frequency at the wind farm level rather than at the level of individual wind turbines. The centralized control unit allows for a centralized wind farm management taking into account the actual state of the complete wind farm rather than of a single wind turbine. Thus, the centralized wind farm management allows for higher dynamics and variable feasibility in regulation to stabilize the grid frequency. Furthermore, the centralized wind farm management allows for a selection of individual turbines according to criteria other than only frequency stabilization.

According to a further embodiment of the present invention, a wind farm with at least two wind turbines connected to a power grid is provided, said wind farm further comprising a coupling device for coupling the wind farm to the power grid, and a sensor element for sensing a first variable indicative of said wind farm wherein said sensor element is adapted to transmit said measured first variable to said coupling device, and wherein said coupling device is adapted to control a second variable of said wind farm according to said measured first variable.

The above described further embodiment of the present invention also allows for a centralized wind farm management taking into account the actual state of the complete wind farm rather than of a single wind turbine. However, by providing a sensor element that senses a specific variable indicative of the actual state of the wind farm, the regulation and control of the wind farm can be performed not only depending on the grid parameters but also on the basis of the internal state of the wind farm. In particular, not only grid parameters like, e.g. the grid frequency, may be monitored, but also setpoints for internal variables such as the actual power delivered to the grid, a maximum power setpoint or the actual voltage at the point of coupling to the grid can be monitored. Accordingly, specific setpoints which may even be prescribed by external parties like, e.g. utilities, can be observed due to monitoring and proper regulation. Moreover, the control of the wind farm may be accomplished via either the same variable as measured or by a different variable. For example, the sensor element may measure the actual voltage, but the coupling means regulates the wind farm by current control.

According to an aspect of the present invention, a method for operating a wind farm is proposed, said method comprising the steps of measuring the grid frequency with a sensor unit, transmitting said measured grid frequency to a control unit, determining whether the measured grid frequency lies outside a predetermined range, and, if the measured grid frequency lies outside said predetermined range, selecting at least one out of the at least two wind turbines comprised in said wind farm by said control unit and regulating the power output of said selected at least one wind turbine.

The above described method allows for a centralized wind farm control and, thus, a centralized wind farm management. Since the management occurs at the highest, i.e. at the wind farm level, the proposed method allows for high dynamics and variable use in the regulation to stabilize grid parameters like, e.g., grid frequency. Furthermore, since the central wind farm management has access to the operational data of each of the wind turbines comprised in the wind farm, the centralized wind farm management may be optimized with respect to various parameters. Thus, not only frequency stabilization may be considered when selecting one or more wind turbines to be curtailed, but also other criteria like wear of parts of the turbine, i.e. lifetime considerations, and/or maintenance considerations and/or the (actual) operating or load conditions of individual turbines can be used to select turbines. Thus, the efficiency of the wind farm management can be increased by centralized wind farm management as compared to the uncoordinated control of individual wind turbines within the wind farm.

According to another aspect of the present invention, a method for operating a wind farm is proposed, said method comprising the steps of measuring a first variable representative of said wind farm by said sensor element, transmitting said measured first variable to a coupling device, determining whether the measured first variable lies outside a predetermined range, and if the measured first variable lies outside the predetermined range, selecting at least one out of the at least two wind turbines comprised in said wind farm by said coupling device and regulating the power output of said selected at least one wind turbine by controlling a second variable of said wind farm.

Also, the above described method according to another aspect of the present invention allows for a centralized wind farm control and, thus, a centralized wind farm management. Accordingly, also this method has the advantages already described in connection with the aforementioned operating method. However, the above described method further allows to obtain not only values of grid parameters, but also values of internal parameters of the wind farm, e.g. the actual power delivered to the grid or the actual current or voltage at the point of coupling to the grid. Therefore, the wind farm management can also be based on inherent restrictions of the wind farm or on requirements prescribed by external parties, e.g. utilities or public authorities. For example, the actual power setpoint or the maximum power setpoint can be commanded externally. Only a centralized wind farm management is capable of observing such requirements. A distributed management based on the independent control of the individual wind turbines comprised in the wind farm may not effectively react to sudden demands related to the stabilization of grid parameters since total output power of the wind farm is not managed coherently. Accordingly, the above described method of centralized control is of a considerably higher flexibility than the independent control of the individual wind turbines.

According to a further aspect of the present invention, a procedure for operating a wind farm is provided, said procedure comprising the steps of operating the wind farm at its maximum total power output while the grid frequency stays within a predetermined range, and reducing the power output according to a method for operating a wind farm according to an aspect of the present invention when the grid frequency exceeds the upper boundary value of said range.

When the wind farm is operated according to the above procedure, maximum gain from the wind farm is obtained since it operates always at maximum output power except for cases where the grid frequency exceeds the upper boundary value of the desired range in which it should remain. In this case, the output power of the wind farm is reduced to stabilize the grid frequency.

According to still another aspect of the present invention, a procedure for operating a wind farm is proposed, said procedure comprising the steps of operating the wind farm at a predetermined power output below the maximum power output of said wind farm while the grid frequency stays within a predetermined range, reducing the power output according to a method for operating a wind farm according to an aspect of the present invention when the grid frequency exceeds the upper boundary value of said range, and increasing the power output according to a method for operating a wind farm according to an aspect of the present invention when the grid frequency undershoots the lower boundary value of said range.

The procedure according to still another aspect of the present invention as described above is especially advantageous when the wind farm is connected to small or unstable grids. In this case, not only the maximum gain from the wind farm is an important issue but also the stabilization of the grid parameters. Therefore, the wind farm operates at partial load even at stable grid conditions with the right grid frequency to function as a "spinning reserve": If the grid frequency deviates from its setpoint, the power output of the wind farm can be increased or decreased to stabilize the grid frequency. If the grid frequency value rises from the defined setpoint, the real power output of the wind farm will be reduced. On the other hand, the power output will be increased, if the frequency drops. The respective shift of the real power output by centralized control of the wind farm thus counteracts the grid frequency variations.

DETAILED DESCRIPTION

Figure 1:
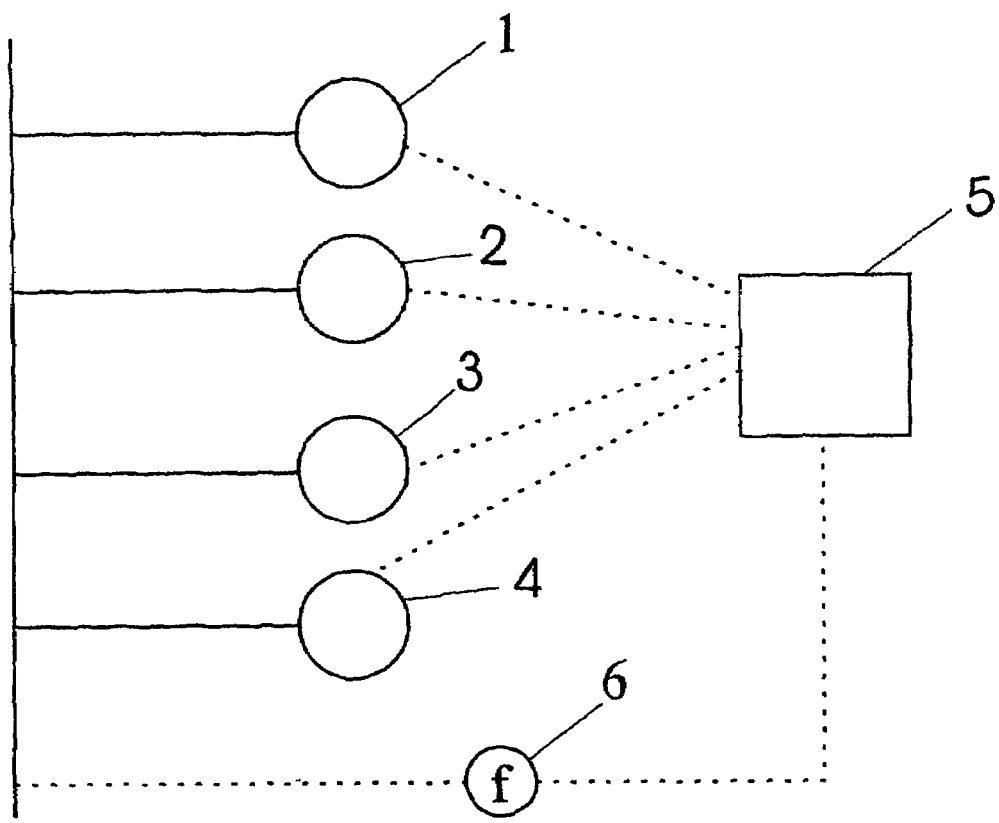
FIG. 1 is a schematic view of a wind farm according to an embodiment of the present invention.

FIG. 1 is a schematic view of a wind farm according to an embodiment of the present invention. The wind farm comprises wind turbines 1, 2, 3, 4 which are connected to a power grid. The wind farm further comprises a centralized control unit 5 which is connected to each of the wind turbines 1, 2, 3, 4. The control unit 5 is adapted to individually select and control the wind turbines 1, 2, 3, 4 of the wind farm. Since the control of wind turbines 1, 2, 3, 4 can be remote, control unit 5 can be placed within or outside the wind farm. Furthermore, a sensor unit 6 is comprised by the wind farm, said sensor unit 6 being connected to said power grid and to said control unit 5. The sensor unit 6 is adapted to measure a relevant grid parameter, e.g. grid frequency. However, also other grid parameters can be used if appropriate. Hereinafter, grid frequency is exemplary used as the measured grid parameter. The grid frequency can be measured at any point within the wind farm or outside of the wind farm. This can be done at a substation or at an individual wind turbine or a remote point of the grid, i.e. sensor unit 6 may be formed as a substation or may be integrated into an individual wind turbine of the wind farm In the following, the operation of the above wind farm is described with reference to FIGS. 6 and 7. As mentioned above, the grid frequency rises if there is more power fed to the grid than is consumed and, vice versa, the grid frequency drops if there is more power consumed than is supplied to the grid. To maintain a desired grid frequency, e.g. 60 Hz for the USA and 50 Hz for Germany, it is desirable to control the actual power output of the wind farm. This control effects that the real power output of the wind farm will be reduced if the grid frequency value rises over a predetermined upper boundary value. There are several possibilities for reducing the actual power output, namely by shutting down individual wind turbines within the wind farm and/or by reducing the power output of individual wind turbines gradually and/or by reducing the power output of individual wind turbines continuously. In the opposite case, i.e. if the grid frequency falls below a predetermined lower boundary value, increased wind farm power output would be required to stabilize the grid. The increase of actual power output can be effected by the control by starting up one or more wind turbines within the wind farm and/or by increasing the power output of individual wind turbines gradually and/or by increasing power output of individual wind turbines continuously. However, when the wind farm is already operated at full power output, this mode of grid stabilization is not possible.

Figure 6:
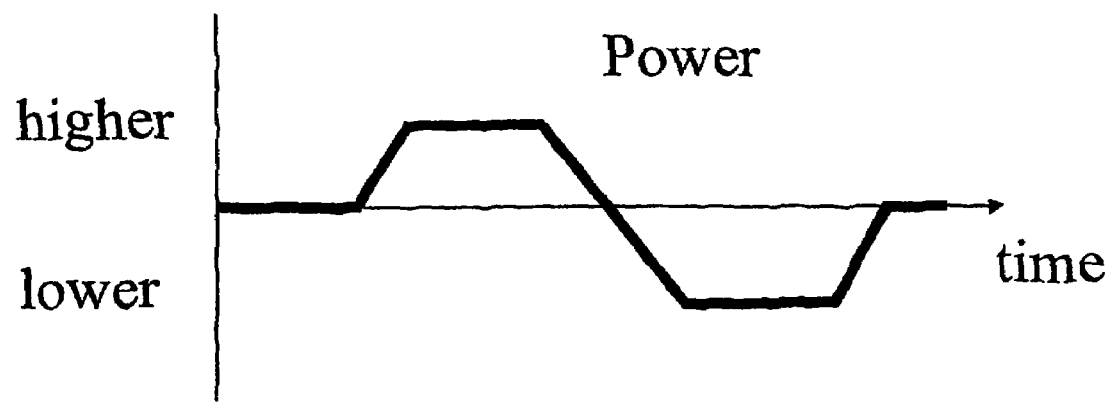
FIG. 6 shows the variation of real power output according to a method for operating a wind farm according to an aspect of the present invention.
Figure 7:
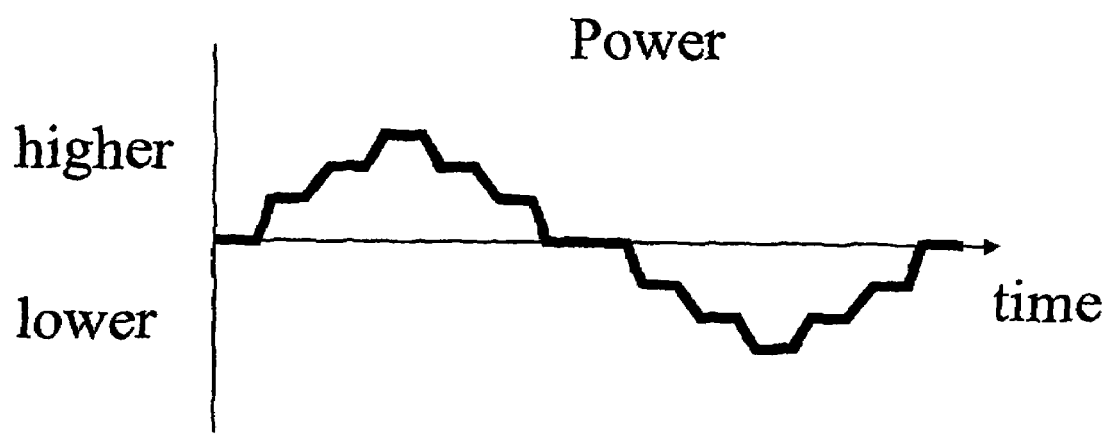
FIG. 7 shows the variation of real power output according to a further method for operating a wind farm according to a further aspect of the present invention.

FIG. 6 shows the variation of the actual output power of the wind farm when it is controlled by continuously increasing or decreasing the power output of individual wind turbines. In contrast to this, FIG. 7 shows the variation of the actual output power of the wind farm when it is controlled by gradually increasing or decreasing the power output of individual wind turbines. A curve like in FIG. 7 may be obtained when shutting down or starting individual wind turbines instead of only decreasing or increasing their power output. In this case, the "upward" steps in the curve in FIG. 7 originate from wind turbines being started, whereas the "downward steps" originate from wind turbines being shut down.

As described above, the output of real power of the wind farm is regulated or controlled according to the measured grid frequency. The grid frequency is measure by sensor unit 6 which transmits the measured grid frequency value to control unit 5. This transmission may occur by any wireless or wire bound means. The centralized control unit 5 regulates the actual power output of the wind farm. In a first step, it determines whether the actual grid frequency is within a predetermined frequency range. If the grid frequency is outside this range, the control unit selects one or more wind turbines to be controlled. The selection criteria that would be used to select a turbine for shut down or reduced operation could be wear of parts of the turbine (life time considerations) and/or maintenance considerations and/or bad operating or load conditions of the individual wind turbine. On the other hand, the same selection criteria would be used to select a turbine for starting up or increased operation but with reversed signs. The control of the individual turbines can be accomplished by curtailing the wind turbines by, e.g., varying the pitch angle or even feathering the rotor blades.

Figure 2:
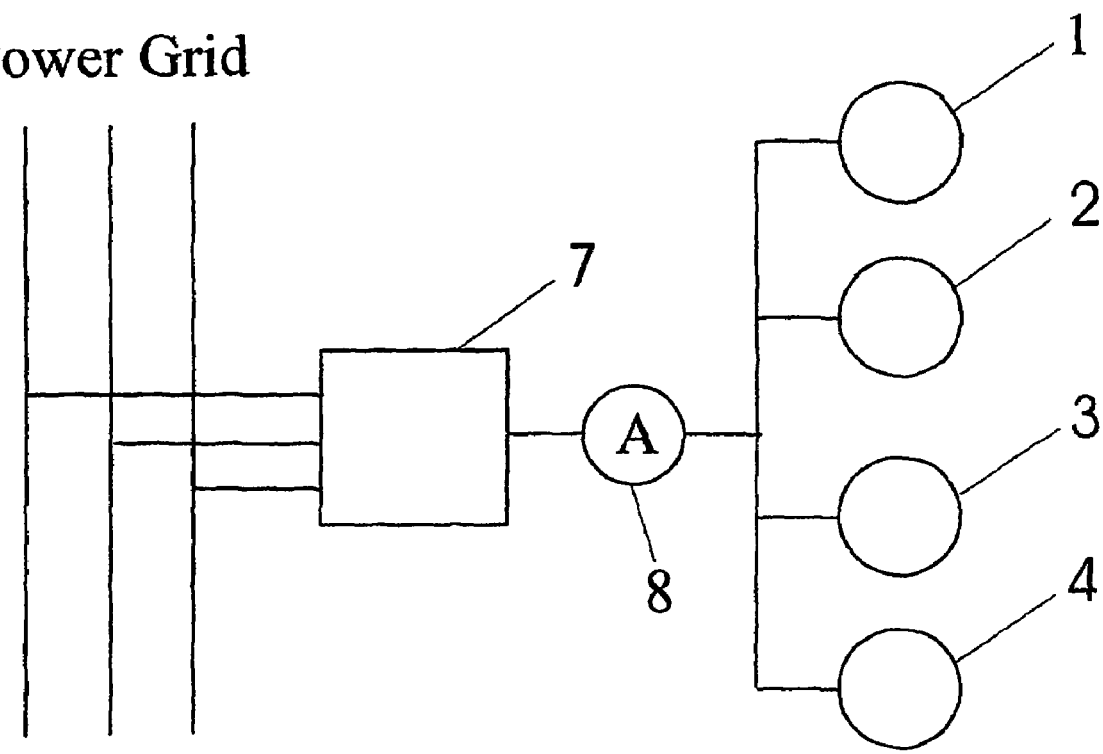
FIG. 2 is a schematic view of a wind farm according to a further embodiment of the present invention.
Figure 3:
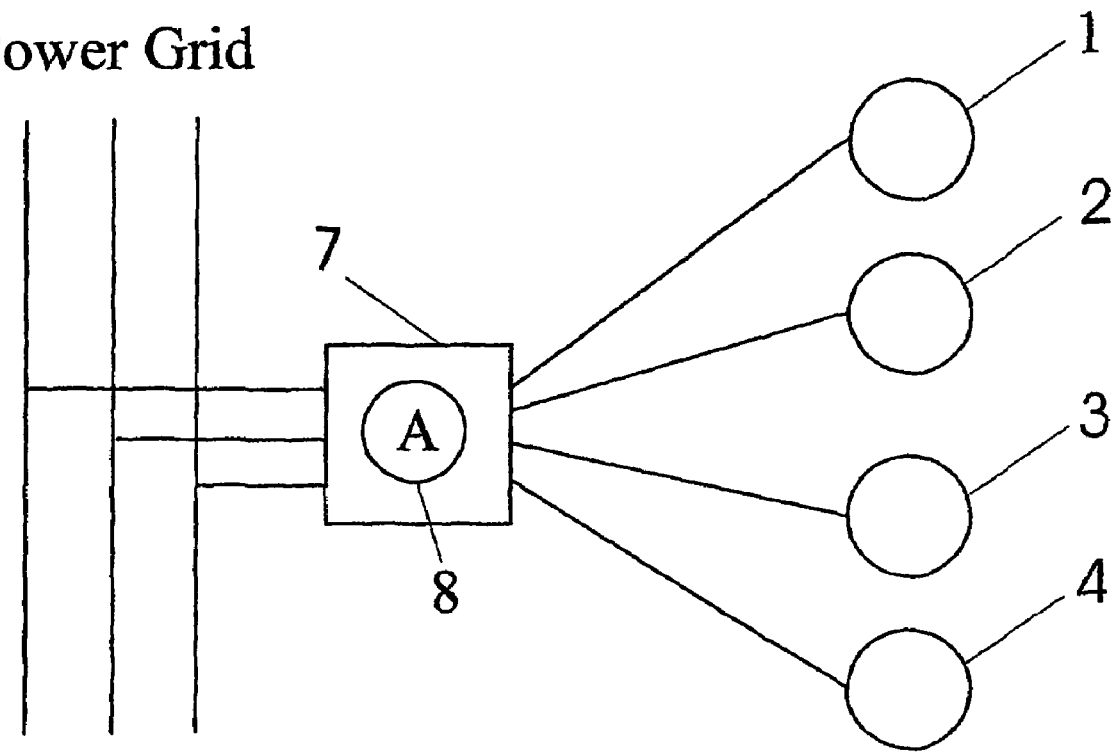
FIG. 3 is a schematic view of a wind farm according to another embodiment of the present invention.

Next, a further embodiment of the present invention is described with reference to FIG. 2 which also shows a wind farm comprising several wind turbines 1, 2, 3, 4. In this embodiment, the wind turbines are not directly coupled to the power grid but are connected via a coupling device 7. The wind farm further comprises a sensor element 8 for measuring a variable of the wind farm. Such a variable indicative of the state of the wind farm can be, e.g., the actual power output or current of the wind farm or the actual voltage at the point of coupling to the power grid. The wind turbines 1, 2, 3, 4 are connected to coupling device 7 via sensor element 8 whereby sensor element 8 is arranged outside the coupling device 7. However, the sensor element 8 can also be integrated into the coupling device 7, similar to the embodiment shown in FIG. 3.

In operation, sensor element 8 measures a variable indicative of the internal state of the wind farm, e.g., the total power output. It then transmits the measure power value to the coupling device 7 which then checks whether the measured power value is within a predetermined range of power values or at a predetermined setpoint. For example, a network operator may prescribe a certain maximum power output for the wind farm which is smaller than the full capacity of the wind farm. In this case, the power output of the wind farm must be regulated to maintain the maximum power value. In case coupling device 7 detects a deviation from the predetermined desired values, it selects one or more wind turbines 1, 2, 3, 4 from the wind farm and reduces or increases their individual power output. Regarding the control of individual wind turbines, reference is made to the above explanations. However, it is to be mentioned that in the present embodiment, the control of the power output may be accomplished by controlling an internal variable of the wind farm, e.g. by current control. Particularly, when controlling the selected wind turbine(s) by an internal variable, e.g. the current output of each individual selected wind turbine or the voltage at the point of coupling to the grid is controlled and regulated.

It should be understood that the features of the first and second embodiments described above can be combined to achieve further advantageous effects. For example, a wind farm may comprise a sensor unit for sensing a grid parameter as well as a sensor element for sensing an internal variable of the wind farm. Furthermore, not only one but more external, i.e. grid, and internal variables can be sensed by additional sensors provided in a wind farm according to an embodiment of the present invention.

Finally, two different procedures for operating a wind farm according to two different aspects of the present invention are described with reference to FIGS. 4 and 5.

Figure 4:
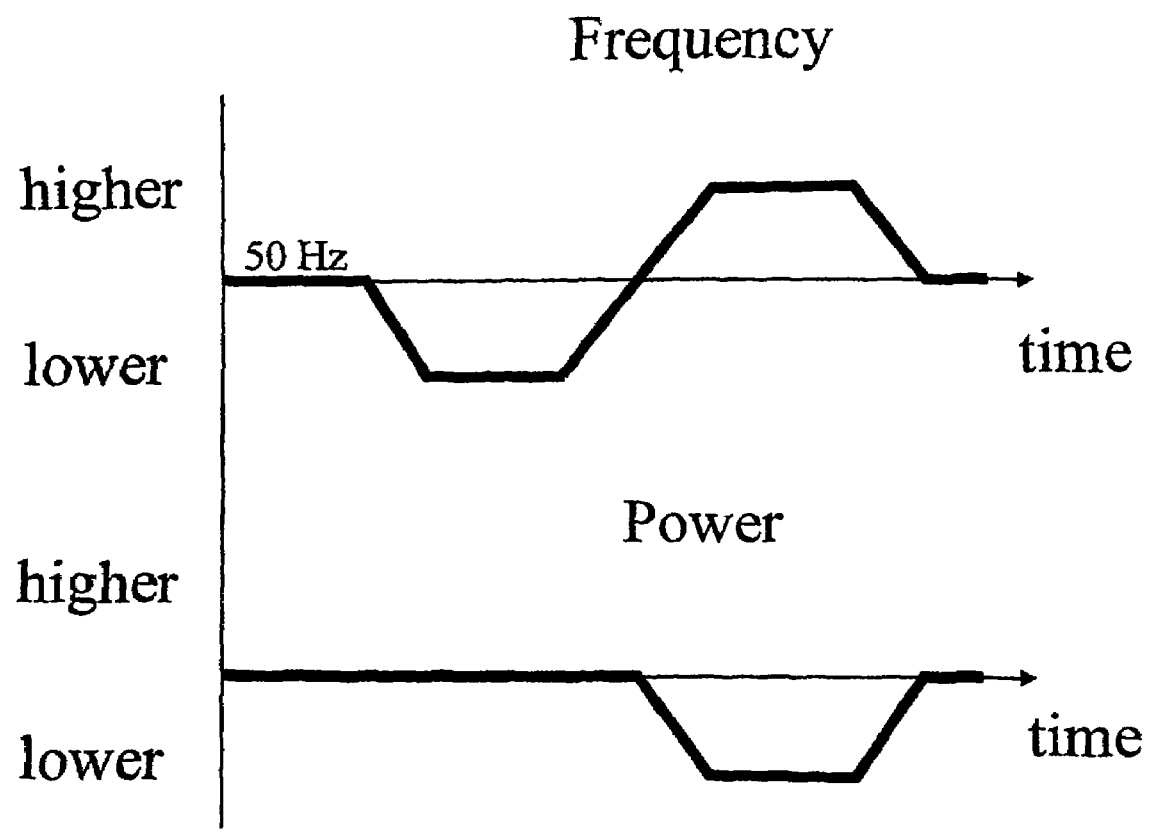
FIG. 4 shows the interrelated variation of grid frequency and real power output according to a procedure for operating a wind farm according to an aspect of the present invention.

FIG. 4 shows the interrelated variation of frequency and power output when the wind farm is operated according to a first procedure. According to this procedure, the wind farm is operated at its maximum total power output while the grid frequency stays within a predetermined range. If, however, the grid frequency exceeds the upper boundary value of said range, the power output of the wind farm is reduced according to any of the aforementioned methods for operating a wind farm. Since the wind farm operates at its maximum power output, it cannot counteract to frequency drops (which require additional power output) but only to a rise in frequency.

Figure 5:
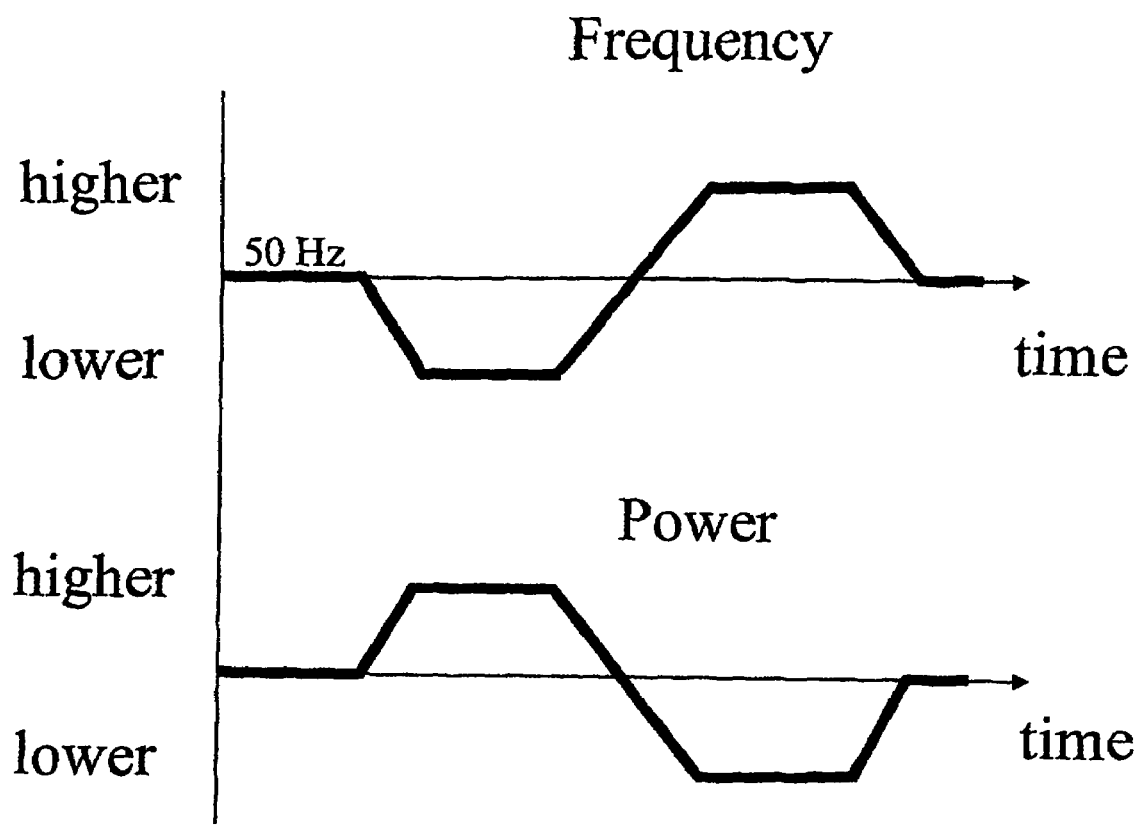
FIG. 5 shows the interrelated variation of grid frequency and real power output according to a procedure for operating a wind farm according to another aspect of the present invention.

FIG. 5 shows the interrelated variation of frequency and power output when the wind farm is operated according to a second procedure. According to this procedure, the wind farm is operated at a predetermined power output below the maximum power output of said wind farm while the grid frequency stays within a predetermined range. If, however, the grid frequency exceeds the upper boundary value of said range, the power output is reduced according to any of the aforementioned methods for operating a wind farm, and, if the grid frequency undershoots the lower boundary value of said range, the power output is increased according to any of the aforementioned methods for operating a wind farm. This operation mode can also stabilize the grid within a wind farm that is not connected to the public grid (isolated grid). This operation mode can also stabilize a weak grid, where the installed wind farm power is a substantial part of the installed power of the generation units of the grid. For example with wind diesel applications or bio gas motor/wind, solar/wind or any combination of above.

The invention claimed is:

1. A wind farm with at least two wind turbines (1, 2, 3, 4) connected to a power grid, further comprising
a coupling device (7) for coupling the wind farm to the power grid,
a sensor element (8) for sensing a first variable representative of said wind farm, wherein said sensor element (8) is adapted to transmit said measured first variable to said coupling device (7),
a control unit (5) connected to said at least two wind turbines (1, 2, 3, 4), and
a sensor unit (6) connected to said power grid and said centralized control unit (5), wherein said sensor unit (6) is adapted to measure the grid frequency of said power grid and to transmit said measured grid frequency to said control unit (5), and
wherein said coupling device (7) is adapted to control a second variable of said wind farm according to said measured first variable, and
wherein said control unit (5) is adapted to control the output of real power of said wind farm according to said measured grid frequency.

2. The wind farm according to claim 1, wherein said sensor unit (6) is a separate substation or integrated into one of said at least two wind turbines (1, 2, 3, 4).

3. The wind farm according to claim 1 or 2, wherein said control unit (6) is adapted to shut down individual wind turbines within the wind farm.

4. The wind farm according to any of the preceding claims, wherein centralized control unit (6) is adapted to gradually and/or continuously reduce the power output of individual wind turbines within the wind farm.

5. The wind farm according to any of the preceding claims, wherein said control unit (6) further comprises a selection unit for selecting individual wind turbines (1, 2, 3, 4) within said wind farm.

6. The wind farm according to any of the preceding claims, wherein said sensor unit (6) is adapted to transmit said measured grid frequency to said control unit (5) by radio, optical, sound or electrical signal means.

7. The wind farm according to any of the preceding claims, wherein said sensor element (8) is integrated into said coupling device (7).

8. The wind farm according to any of the preceding claims, wherein said first variable is the actual power output of the wind farm, the actual output current of the wind farm or the actual voltage at the point of coupling to the power grid.

9. The wind farm according to any of the preceding claims, wherein said second variable is the total current output of the wind farm.

10. The wind farm according to any of the preceding claims, wherein the coupling device comprises semiconductor switching devices for controlling the power output of said wind farm.

11. A method for operating a wind farm according to any of claims 1 to 10, said method comprising the steps of:
measuring a first variable representative of said wind farm by said sensor element,
measuring the grid frequency with a sensor unit,
transmitting said measured first variable to a coupling device,
transmitting said measured grid frequency to a control unit,
determining whether the measured first variable lies outside a predetermined range, and, if the measured first variable lies outside the predetermined range, selecting at least one out of the at least two wind turbines comprised in said wind farm by said coupling device and regulating the power output of said selected at least one wind turbine by controlling a second variable of said wind farm, and
determining whether the measured grid frequency lies outside a predetermined range, and, if the measured grid frequency lies outside said predetermined range, selecting at least one out of the at least two wind turbines comprised in said wind farm by said control unit and regulating the power output of said selected at least one wind turbine.

12. The method according to claim 11, wherein said second variable is the current output of said selected at least one wind turbine or the actual voltage at the point of coupling to the grid.

13. The method according of claim 11 or 12, wherein the criteria for selecting the at least one wind turbine are life time and/or maintenance considerations and/or operating or load conditions of an individual wind turbine.

14. The method according to any of claims 11 to 13, wherein the selected at least one wind turbine is shut down or started.

15. The method according to any of claims 11 to 13, wherein the controlled variable, especially power output, current output or voltage at the point of coupling to the grid, of said selected at least one wind turbine is reduced or increased gradually.

16. The method according to any of claims 11 to 13, wherein the controlled variable, especially power output, current output or voltage at the point of coupling to the grid, of said selected at least one wind turbine is reduced or increased continuously.

17. A procedure for operating a wind farm according to claim 16, comprising the steps of:
operating the wind farm at its maximum total power output while the grid frequency stays within a predetermined range, and
reducing the power output according to a method when the grid frequency exceeds the upper boundary value of said range.

18. A procedure for operating a wind farm according to claim 16, comprising the steps of:
operating the wind farm at a predetermined power output below the maximum power output of said wind farm while the grid frequency remains within a predetermined range,
reducing the power output according to a method when the grid frequency exceeds the upper boundary value of said range, and
increasing the power output according to a method when the grid frequency undershoots the lower boundary value of said range.

* * * * *

(12) EX PARTE REEXAMINATION CERTIFICATE (7th)
Ex Parte Reexamination Ordered under 35 U.S.C. 257

United States Patent
Lütze et al.

(10) Number: US 7,372,173 C1
(45) Certificate Issued: Aug. 27, 2014

(54) WIND FARM AND METHOD FOR OPERATING SAME

(75) Inventors: Hans Lütze, Bad Bentheim (DE); Stefan Rieken, Fresenburg (DE); Dietmar Meyer, Bremen (DE)

(73) Assignee: General Electric Company, Schenectady, NY (US)

Supplemental Examination Request:
No. 96/000,009, Dec. 18, 2012

Reexamination Certificate for:
Patent No.: 7,372,173
Issued: May 13, 2008
Appl. No.: 10/549,379
Filed: Jun. 15, 2006

(21) Appl. No.: 96/000,009

(22) PCT Filed: Apr. 8, 2004

(86) PCT No.: PCT/EP2004/003804
§ 371 (c)(1),
(2), (4) Date: Jun. 15, 2006

(87) PCT Pub. No.: WO2005/067119
PCT Pub. Date: Jul. 21, 2005

(30) Foreign Application Priority Data

Apr. 9, 2003 (EP) .................................... 03008295

(51) Int. Cl.
*F03D 9/00* (2006.01)
*H02P 9/04* (2006.01)

(52) U.S. Cl.
USPC .............................................. 290/44; 290/55

(58) Field of Classification Search
None
See application file for complete search history.

(56) References Cited

To view the complete listing of prior art documents cited during the supplemental examination proceeding and the resulting reexamination proceeding for Control Number 96/000,009, please refer to the USPTO's public Patent Application Information Retrieval (PAIR) system under the Display References tab.

*Primary Examiner* — Robert Nasser

(57) ABSTRACT

A wind farm with at least two wind turbines (1, 2, 3, 4) connected to a power grid is provided, said wind farm further comprising a control unit (5) connected to said at least two wind turbines (1, 2, 3, 4), and a sensor unit (6) connected to said power grid and said control unit (5), wherein said sensor unit (6) is adapted to measure the grid frequency of said power grid and to transmit said measured grid frequency to said control unit (5), and wherein said control unit (5) is adapted to control the output of real power of said wind farm according to said measured grid frequency. Furthermore, a method for operating a wind farm is proposed, said method comprising the steps of measuring the grid frequency with a sensor unit, transmitting said measured grid frequency to a centralized control unit, determining whether the measured grid frequency lies outside a predetermined range, and, if the measured grid frequency lies outside said predetermined range, selecting at least one out of the at least two wind turbines comprised in said wind farm by said centralized control unit and regulating the power output of said selected at least one wind turbine.

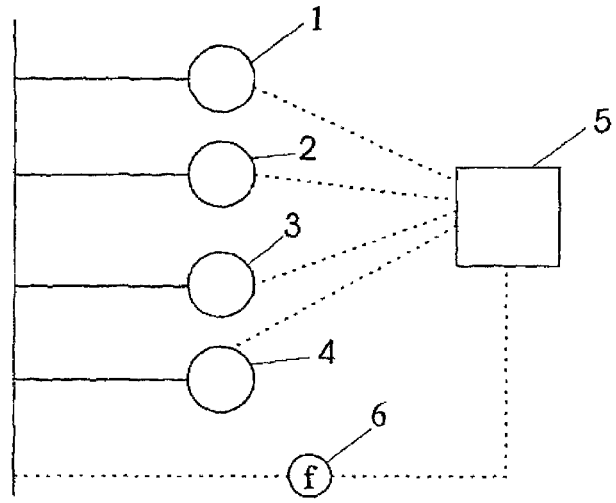

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 18 is cancelled.

Claims 1-17 are determined to be patentable as amended.

New claims 19-20 are added and determined to be patentable.

1. A wind farm with at least two wind turbines [(1, 2, 3, 4)] connected to a power grid *and that can be controlled based on a grid frequency and an internal state of the wind farm*, [further] *the wind farm* comprising*:*
    a coupling device [(7)] for coupling the wind farm to the power grid,
    a sensor element [(8)] for sensing a first variable representative of [said] *the internal state of the* wind farm, wherein [said] *the* sensor element [(8)] is adapted to transmit [said] *the* measured first variable to [said] *the* coupling device [(7)],
    a control unit [(5)] connected to [said] *the* at least two wind turbines [(1, 2, 3, 4)], and
    a sensor unit [(6)] connected to [said] *the* power grid and [said] *the* centralized control unit [(5)] *for measuring a grid frequency*, wherein [said] *the* sensor unit [(6)] is adapted to measure the grid frequency of [said] *the* power grid and to transmit [said] *the* measured grid frequency to [said] *the* control unit [(5)], and
    wherein [said] *the* coupling device [(7)] is adapted to control a second variable of [said] *the* wind farm according to [said] *one or more setpoints related to the* measured first variable, and
    wherein [said] *the* control unit [(5)] is adapted to control the output of real power of [said] *the* wind farm according to [said] *the* measured grid frequency *and the one or more setpoints*, and
    *wherein the control unit is adapted to operate the wind farm at a predetermined power output below a maximum power output of the wind farm while the measured grid frequency remains within a predetermined range, reduce the power output of the wind farm when the grid frequency exceeds an upper boundary value of the range, and increase the power output of the selected at least one wind turbine when the grid frequency undershoots a lower boundary value of the range.*

2. The wind farm [according to] *of* claim 1, wherein [said] *the* sensor unit [(6)] is a separate substation or integrated into one of [said] *the* at least two wind turbines [(1, 2, 3, 4)].

3. The wind farm [according to] *of* claim 1 [or 2], wherein [said] *the* control unit [(6)] is adapted to shut down individual wind turbines within the wind farm.

4. The wind farm [according to any of the preceding claims] *of claim 1*, wherein [centralized] *the* control unit [(6)] is adapted to gradually and/or continuously reduce the power output of individual wind turbines within the wind farm.

5. The wind farm [according to any of the preceding claims] *of claim 1*, wherein [said] *the* control unit [(6)] further comprises a selection unit for selecting individual wind turbines [(1, 2, 3, 4)] within [said] *the* wind farm.

6. The wind farm [according to any of the preceding claims] *of claim 1*, wherein [said] *the* sensor unit [(6)] is adapted to transmit [said] *the* measured grid frequency to [said] *the* control unit [(5)] by radio, optical, sound or electrical signal means.

7. The wind farm [according to any of the preceding claims] *of claim 1*, wherein [said] *the* sensor element [(8)] is integrated into [said] *the* coupling device [(7)].

8. The wind farm of [according to any of the preceding claims] *of claim 1*, wherein [said] *the* first variable is the actual power output of the wind farm, the actual output current of the wind farm or the actual voltage at the point of coupling to the power grid.

9. The wind farm [according to any of the preceding claims] *of claim 1*, wherein [said] *the* second variable is [the total current output of the wind farm] *a current output of at least one wind turbine of the wind farm*.

10. The wind farm [according to any of the preceding claims] *of claim 1*, wherein the coupling device comprises semiconductor switching devices for controlling the power output of [said] *the* wind farm.

11. A method for operating a wind farm [according to any of claims 1 to 10, said] *with at least two wind turbines connected to a power grid and controlling the wind farm based on a grid frequency and an internal state of the wind farm, the wind farm comprising:*
    *a coupling device for coupling the wind farm to the power grid,*
    *a sensor element for sensing a first variable representative of the internal state of the wind farm, the sensor element being adapted to transmit the measured first variable to the coupling device,*
    *a control unit connected to the at least two wind turbines, and*
    *a sensor unit connected to the power grid and the centralized control unit for measuring a grid frequency, the sensor unit being adapted to measure the grid frequency of the power grid and to transmit the measured grid frequency to the control unit, the coupling device being adapted to control a second variable of the wind farm according to one or more setpoints related to the measured first variable, and the control unit being adapted to control the output of real power of the wind farm according to the measured grid frequency and the one or more setpoints, the method* method comprising the steps of:
    measuring [a] *the* first variable representative of [said] *the* wind farm by [said] *the* sensor element,
    measuring the grid frequency with [a] *the* sensor unit,
    transmitting [said] *the* measured first variable to [a] *the* coupling device,
    transmitting [said] *the* measured grid frequency to [a] *the* control unit,
    determining whether the measured first variable lies outside a predetermined range, and, if the measured first variable lies outside the predetermined range, selecting at least one out of the at least two wind turbines comprised in [said] *the* wind farm by [said] *the* coupling device and regulating the power output of [said] *the* selected at least one wind turbine by controlling a second variable of [said] *the* wind farm, and
    determining whether the measured grid frequency lies outside a predetermined range, and, if the measured grid frequency lies outside [said] *the* predetermined range, selecting at least one out of the at least two wind turbines comprised in [said] *the* wind farm by [said] *the* control unit and regulating the power output of [said] *the* selected at least one wind turbine,

*wherein the method further comprises operating the wind farm at a predetermined power output below the maximum power output of the wind farm while the grid frequency remains within the predetermined range, reducing the power output of the wind farm when the grid frequency exceeds the upper boundary value of the range, and increasing the power output of the selected at least one wind turbine when the grid frequency undershoots the lower boundary value of the range.*

12. The method [according to] *of* claim 11, wherein [said] *the* second variable is the current output of [said] *the* selected at least one wind turbine or the actual voltage at the point of coupling to the grid.

13. The method [according] *of* claim 11 [or 12], wherein the criteria for selecting the at least one wind turbine are life time and/or maintenance considerations and/or operating or load conditions of an individual wind turbine.

14. The method [according to any of claims 11 to 13] *of claim 11*, wherein the selected at least one wind turbine is shut down or started.

15. The method [according to any of claims 11 to 13] *of claim 11*, wherein the controlled variable[, especially] includes at least one of power output, current output, or voltage at the point of coupling to the grid[, of said] *and the controlled variable of the* selected at least one wind turbine is reduced or increased gradually.

16. The method [according to any of claims 11 to 13] *of claim 11*, wherein the controlled variable[, especially] includes at least one of power output, current output, or voltage at the point of coupling to the grid[, of said] *and the controlled variable of the* selected at least one wind turbine is reduced or increased continuously.

17. A procedure for operating a wind farm according to claim [16] *11*, comprising the steps of:

operating the wind farm at its maximum total power output while the grid frequency stays within [a] *the* predetermined range, and reducing the power output [according to a method] *of the wind farm* when the grid frequency exceeds [the] *an* upper boundary value of [said] *the* range.

*19. The wind farm of claim 1, wherein the control unit controls the output of real power by curtailing one or more of the at least two wind turbines.*

*20. The wind farm of claim 19, further comprising a selection unit for selecting wind turbines within the wind farm, wherein the control unit controls the output of real power by curtailing wind turbines selected by the selection unit based on their operating conditions.*

\* \* \* \* \*